United States Patent

[11] 3,632,957

[72] Inventor Malcolm D. Hannah
 Cambridge, England
[21] Appl. No. 856,564
[22] Filed Sept. 10, 1969
[45] Patented Jan. 4, 1972
[73] Assignee The Welding Institute
 Cambridge, England
[32] Priority Sept. 13, 1968
[33] Great Britain
[31] 43,737/68

[54] RESISTANCE WELDING
 6 Claims, 5 Drawing Figs.
[52] U.S. Cl..................................................... 219/119
[51] Int. Cl..................................................... B23k 9/24,
 B23k 11/30
[50] Field of Search........................................... 219/119,
 117 HD, 84, 120, 81, 82

[56] References Cited
 UNITED STATES PATENTS
| | | | |
|---|---|---|---|
| 3,079,487 | 2/1963 | Rohr | 219/117 HD |
| 2,244,455 | 6/1941 | Gengenbach | 219/119 |
| 2,747,064 | 5/1956 | Van Pappelendam | 219/117 HD |

*Primary Examiner*—J. V. Truhe
*Assistant Examiner*—Lawrence A. Rouse
*Attorney*—Kemon, Palmer & Estabrook

ABSTRACT: For resistance welding, an electrode assembly includes auxiliary nonconductive clamping means providing a resilient supporting surface flanking the electrode work face. For a spot-welding electrode the auxiliary clamping means may be a sleeve enclosing the electrode; for a seam-welding roller electrode it may be a pair of discs or rings, one on each side of the roller electrode. Its primary use is in overcoming difficulties experienced in the welding of soft heavy metals such as lead, for example.

PATENTED JAN 4 1972

Inventor
Malcolm D. Hannah
By
Kenyon, Palmer & Estabrook
Attorneys

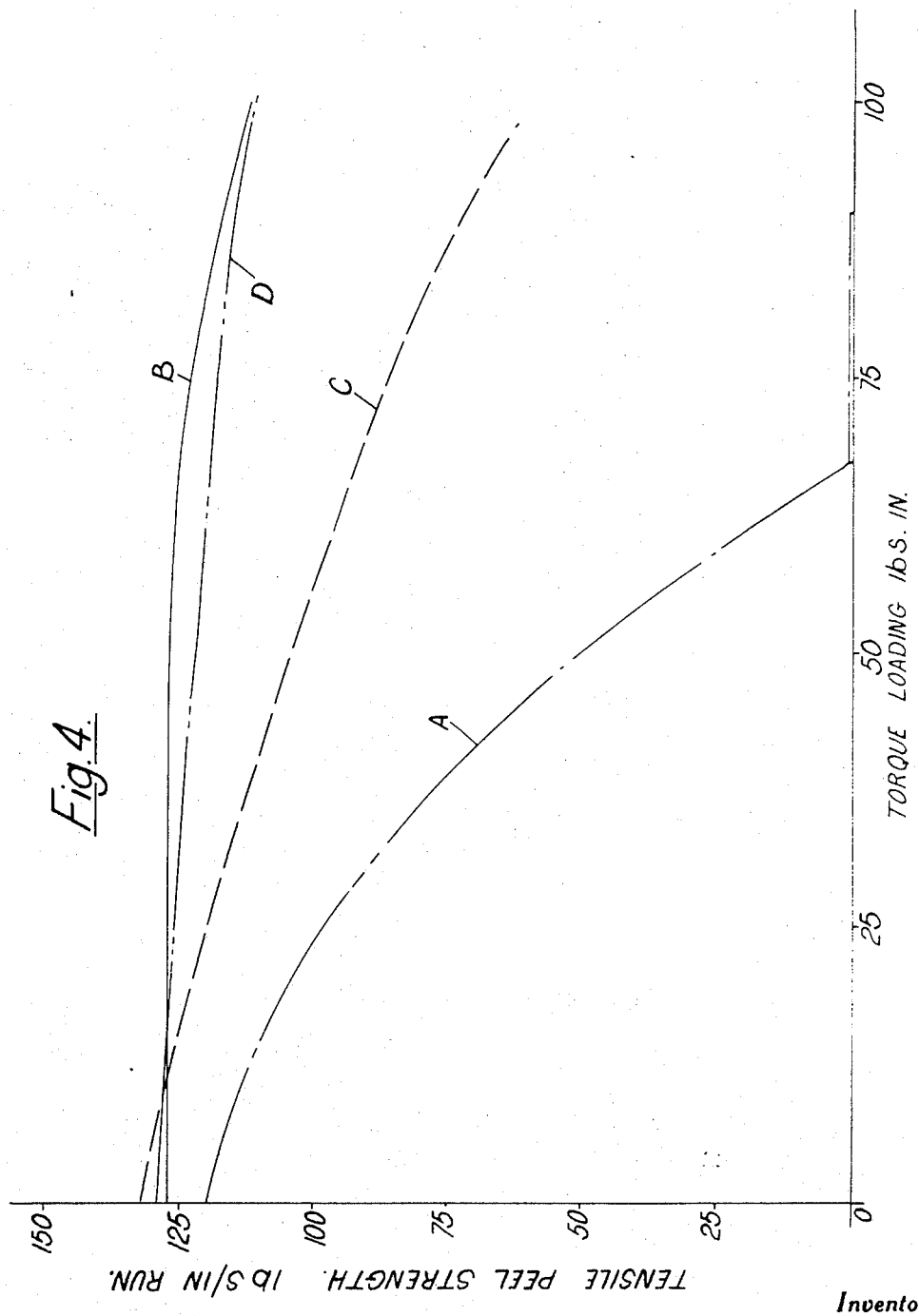

RESISTANCE WELDING

This invention is concerned with resistance welding. It is especially useful in the welding of heavy, soft metals but can also be used with advantage for welding other metals in certain circumstances.

The proved reliability of resistance welding for the many metals with which it is normally used and in the normal conditions of use would suggest that the process could be applied to other metals or in other conditions without giving rise to quality difficulties and consequently that the quality checks need be no more stringent than those used for the metals with which resistance welding is commonly employed. Unfortunately, this assumption would be wrong in the case of lead and other metals of comparable weight and softness, even if the resistance-welding current and its duration, the electrode load, the electrode size, shape and its surface condition are carefully controlled. When resistance welding is used for dispersion-hardened lead, for example, a surprisingly large number of low-strength welds result and unless this unusual behavior is appreciated and corrected, structural failures may occur.

It appears that there is no single cause which explains the high incidence of low-strength welds but there are a number of factors which contribute and interact with one another.

We have found that there is much less tolerance in welding conditions for heavy soft metals than for other metals and we have discovered that this is largely due to the sensitivity of the weld in heavy, soft metals to anything which causes the normal distribution of supporting pressures to be upset. Factors which may upset the pressure distribution are leverage due to the weight of the material, leverage due to slight obliquity in the presentation of the work to the electrodes or due to the presentation of the work at the wrong level, so that the electrodes have to lift the material, thereby introducing a torque. In the case of dispersion-hardened lead, there is the further difficulty that excessive melting or fusion of the dispersion-hardened lead causes the dispersion-hardening agent to foam, resulting in porosity and low-strength welds. Therefore it is necessary to use welding conditions that avoid excessive melting. Because the growth of the weld nugget is relatively rapid once the nugget has been formed, small variations in welding conditions can result in a much-diminished or even nonexistent weld nugget. Consequently the necessity to avoid excessive melting results in a further decrease in tolerance in the welding conditions (for example current amplitude) than when welding mild steel, for example. The smallest weld which will give the required strength and leaktightness is generally preferred. However, for metals of low hot strength the electrode forces which can be used are markedly lower than for steel so that in the absence of the present invention the above-mentioned leverages have a greater effect than for other metals. In addition, because such metals are of high specific gravity, this leverage is greater than the size of the workpiece assemblies would suggest. To resist this leverage it would be desirable to produce a larger weld nugget but this could not be satisfactorily achieved by increasing the current because in practice the required compensating current varies greatly with small changes in leverage or small variations of component size. Moreover, in dispersion-hardened lead, the increased current might result in porosity, as explained above.

We have discovered that the number of low-strength welds can be greatly reduced in a relatively simple way. According to the invention, in a resistance-welding machine, at least one of the electrodes forms part of an electrode assembly which additionally includes auxiliary nonconductive clamping means enclosing the electrode so as to provide at the working face of the assembly a resilient supporting surface flanking the electrode work face. Thus the overall electrode assembly applies support over a large area leaving the current path or area of the electrode in contact with the work unchanged. The reference to the auxiliary clamping means "enclosing" the electrode is not restricted to arrangements in which the auxiliary clamping means completely surrounds an electrode like a sleeve but is intended to cover also an arrangement in which the auxiliary clamping means comprises a pair of discs or rings, one on each side of a roller electrode for seam welding.

The additional support provided in apparatus embodying the present invention relieves the strain due to this leverage and makes it possible to produce small but strong welds in welding conditions which fall within the permissible limits.

In resistance seam welding the auxiliary clamping means can take the form of rollers, one on each side of each electrode roller, the auxiliary rollers providing an extended supporting and aligning surface for the workpiece and enclosing the electrode roller between them. The auxiliary rollers may be mounted independently of the electrode rollers or, where space is limited, they may take the form of insulated discs fixed at each side of the electrode rollers. These discs may be made from nylon so that they deform elastically, providing support for the lead without causing excessive marking and while allowing the electrode to exert its full force unhindered. With resistance spot welding the clamps can be of cylindrical form surrounding the electrode and may be pressurized separately or supported by springs or elastic nylon and rubber means from the electrode assembly itself. In the latter case the force between the electrodes is the difference between the applied force and the force provided by the extra clamps.

Although the invention has been developed for improving the quality of welds made with workpieces of soft heavy metals, apparatus embodying the invention may be employed with advantage in some conditions when other metals are being welded. As an example, a portable gun welder may usefully be provided with the auxiliary clamping means to overcome the tendency for small welds to be produced in mild steel, for example, due to the operator's inability to hold the gun steady and at a consistent angle to the workpiece.

In order that the invention may be better understood, one example of apparatus embodying the invention will now be described with reference to the accompanying drawings, in which:

FIG. 4 is a graph showing the increased strength obtained by the use of the invention.

Figure 1:
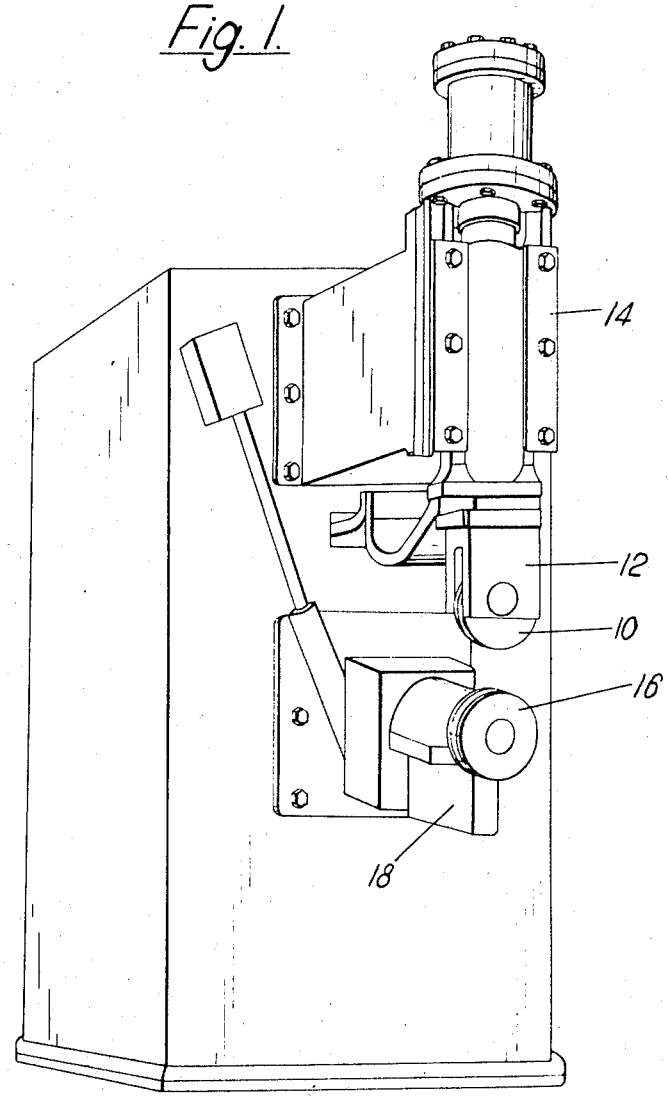
FIG. 1 shows a resistance-welding machine.

The resistance-welding machine shown in FIG. 1 is of conventional design with the exception of the electrode assemblies. The upper electrode assembly 10 is a wheel mounted for rotation in a fork 12. The fork 12 is mounted for sliding motion in a housing 14. This permits the upper electrode assembly to be moved towards or away from the lower electrode assembly 16, which is a wheel mounted for rotation on a fixed support 18.

Figure 2:
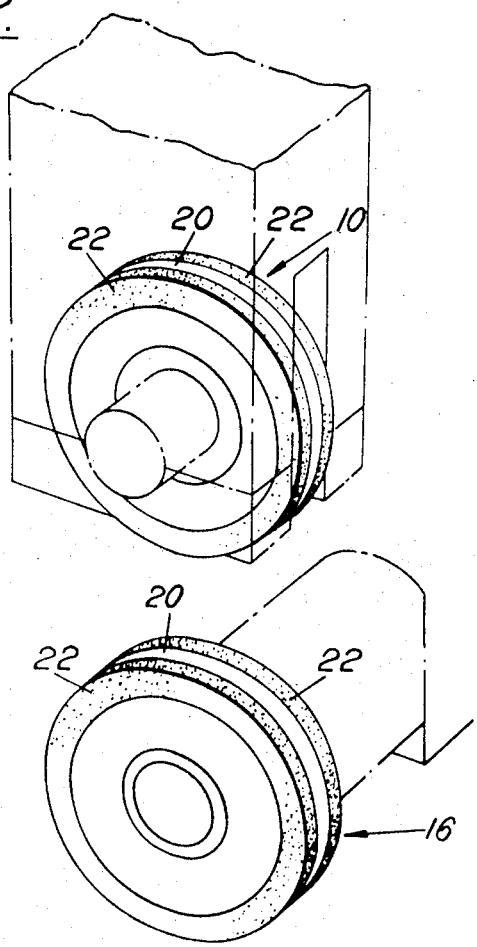
FIG. 2 is a perspective view of the electrode arrangement.

As shown in FIG. 2, each of the electrode assemblies 10 and 12 consists of an electrode wheel 20, which is of copper, having on each side a nylon ring 22.

Figures 3, 3A:
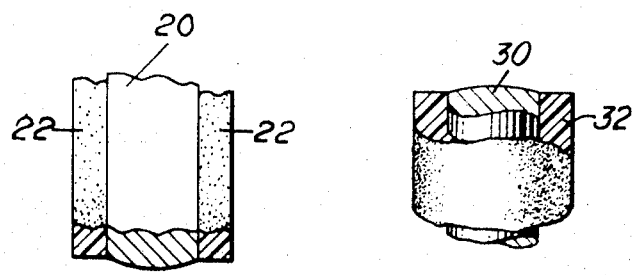
FIG. 3 illustrates the shape of the peripheral surface of the electrode wheels.
FIG. 3A shows a spot-welding electrode.

As shown in FIG. 3, the copper electrode wheel has a domed edge and the edges of the nylon rings are slightly behind the outermost point of the electrode edge. In the example shown, the distance $x$ was 0.01 inch.

FIG. 4 shows in graphical form the benefits conferred by the invention. For seam welds, the tensile peel strength was measured for workpieces of dispersion-hardened lead subjected to different values of torque loading during welding. The torque was imposed by hanging weights on to a roller which pressed on to the upper edge of the superimposed sheets being welded. Strips were then cut from the welded sheets so that each strip had a transverse weld line close to one end. At the other end the free portions of the workpieces were bent back and pulled apart. The tensile peel strengths quoted are in terms of pounds per inch length. Curve A relates to a weld made with a current of 10.2 ka., with conventional seam-welding rollers. It will be seen that the peel strength decreased rapidly with increased torque loading and that at the upper end of the torque-loading range there was no effective weld. Curve B shows the improvement obtained when electrode assemblies incorporating the present invention were used. In this case, the peel strength was substantially constant throughout the range of torque loading. When the current was increased to 11 ka., a seam weld made with a conventional welding roller gave results represented by curve C. Again there is a steady decrease in peel strength with increasing torque loading although the rate of decrease is smaller than in the case of weld A. Finally, curve D shows the effect of using electrode assemblies embodying the invention at the higher current used for curve C. Again, the peel strength is substantially constant throughout the range of torque loading.

The rings 22 which provide flanking support for the electrode roller 20 may be loaded independently of the electrode roller or the rings may be resiliently loaded with respect to the electrode roller. The rings or other auxiliary clamping means should exert a force equal to or less than that exerted by the electrodes.

The above example is concerned with seam welding but the invention is equally applicable to spot welding. In one experiment we used a copper electrode of ¾ inches diameter to weld lead by the resistance-welding process. The electrode had a dome of 3-inch radius at its end. Welds were made with and without a nylon sleeve having a thickness of three-eighths inch. The electrode load was approximately 500 lbs. in each case and in addition to the normal torque on the weld due to the weight of the components being welded, we applied a supplementary torque load by hanging weights on the components. In each case we produced a weld nugget of ¼ inches diameter initially, with no supplementary torque applied, but when supplementary torque was added we found that the strength of welds made without the nylon sleeve was invariably less than those made with the sleeve in position and in extreme cases the weakness resulted in a face fracture.

As explained above, the difficulties of making a good weld would be less significant if the welding conditions were less critical, as in common materials like mild steel. In such cases, the effects described above would only cause a reduction in nugget size and not the catastrophic loss of weld strength which results with lead, for example.

In some cases, the auxiliary clamping means may be of rigid material but resiliently mounted. This may be useful, for example, for spot-welding electrodes, where as shown on FIG 3A the auxiliary clamping means is a sleeve 32 surrounding the rod-shaped end of the electrode 30.

I claim:

1. A resistance-welding machine having a pair of electrodes adapted to engage and clamp opposite sides of planar work to be welded, each of said electrodes being constituted by a single electrically conducting member and one at least of said conducting members being flanked at each side by auxiliary nonconductive yieldable clamping means, said conducting member projecting slightly beyond said clamping means whereby said clamping means is normally ineffective to clamp the work but may, in response to torque loading on the work, provide resilient support for the work to maintain substantially unchanged the area of contact between the work and said conducting members.

2. A machine as claimed in claim 1, wherein each conducting member is a rod and the auxiliary clamping means is a sleeve surrounding said rod.

3. A machine as claimed in claim 1, wherein each conducting member is a roller and the auxiliary clamping means is a pair of discs disposed on opposite sides of and in contact with said roller.

4. A machine as claimed in claim 1, in which the auxiliary clamping means is spring-loaded towards the work.

5. A machine as claimed in claim 1, in which the auxiliary clamping means is elastically deformable.

6. A machine as claimed in claim 5, in which the auxiliary clamping means is of nylon.

* * * * *